Oct. 30, 1962   D. N. SHAW   3,060,919
CHARCOAL QUENCH DEVICE FOR BROILERS
Filed Jan. 31, 1961
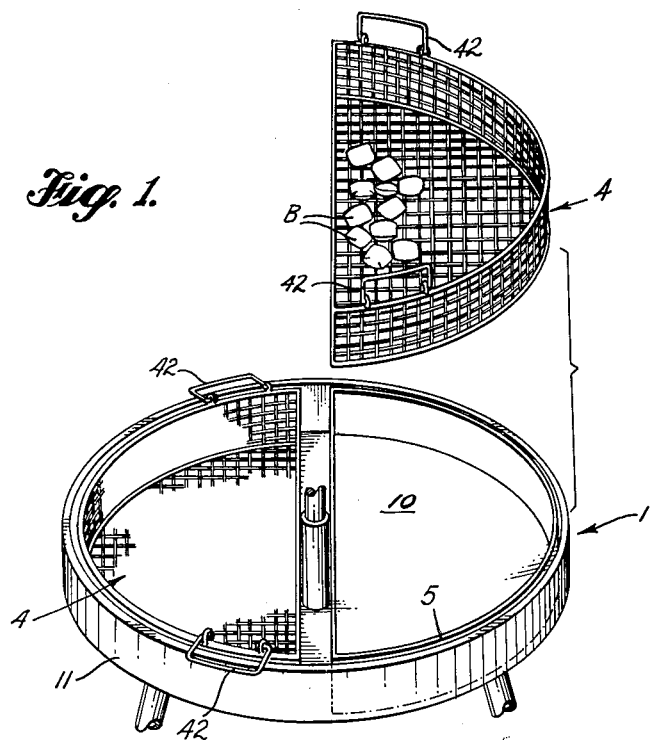
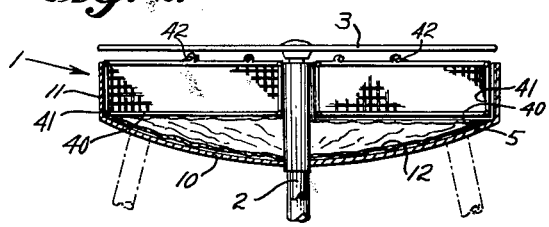
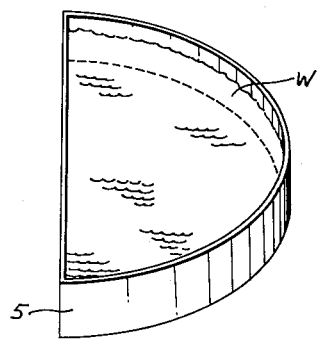
INVENTOR.
DOROTHY N. SHAW
BY
Reynolds + Christensen
ATTORNEYS

United States Patent Office 3,060,919
Patented Oct. 30, 1962

3,060,919
CHARCOAL QUENCH DEVICE FOR BROILERS
Dorothy N. Shaw, 11955 Marine View Drive SW., Seattle 66, Wash.
Filed Jan. 31, 1961, Ser. No. 86,223
3 Claims. (Cl. 126—25)

Charcoal broilers are in widespread use for outdoor grilling of meats and the like. Primarily they include a bowl or other open-top receptacle, in the bottom of which is usually laid a layer of sand, small gravel or other material to absorb heat and protect the metal bow beneath it, and to catch drippings, together with a grill which is supported at a distance above the bottom of the bowl and which usually can be raised or lowered, whereon the meat to be cooked is laid. In a widely used form of the broiler the bowl and grill are round, and the rear half of the broiler is hooded over.

The fuel used in such broilers is ordinarily charcoal, generally in the form of briquets. These are laid upon the bed of sand or small gravel and ignited, and when the mass is thoroughly glowing the grill is adjusted to the proper height, and the grilling proceeds. When the grilling is finished, however, the charcoal normally is not consumed, and many persons quench it for reuse later by removing each individual briquet or lump with tongs and quenching it in water.

The present invention concerns primarily the problem of quenching after the grilling is completed and contemplates in combination with a bowl and grill as heretofore, a basket of woven wire or otherwise of foraminous material, of such size and shape that it can be supported within the bowl beneath the grill, to support the briquets, and which when the grilling is completed can be lifted from the bowl and immersed, for instantly quenching the glowing charcoal it contains, in a tub of water, of a size and shape to receive the basket, and preferably so closely conforming to the shape of the basket that the two can nest together, and both within the bowl, for storage.

The primary object of the invention is to provide a device of the nature just indicated, and especially one which is of compact, simple and relatively inexpensive, rugged construction, as shown in the accompanying drawings in a representative form, and as will be more fully explained herein and defined in the claims.

FIGURE 1 is an isometric view of the bowl of a charcoal broiler with the grill removed, and with one basket which is a part of the present invention shown in place therein, and a complementally formed second, similar basket shown lifted from the bowl.

FIGURE 2 is an axial sectional view through the broiler bowl, basket and broiler grill, in position for use.

FIGURE 3 is an isometric view of the quenching tub into which the uplifted basket of FIGURE 1 may be immersed for quenching its content of briquets, and in which it may be nested for compact storage of the two in the bowl, as depicted by the broken line showing in FIGURE 1.

While it will be self-evident that the shape of the broiler and its component parts may be any of various shapes, the invention is particularly adapted for use in the broiler of the round style describe above, and is shown in association with such a broiler. The principles of the invention, however, except as limited by the appended claims, are to be understood as applicable to broilers of different shapes. The bowl 1 of such a broiler is indicated as having a bottom 10, which slopes downwardly towards its center from an upstanding marginal rim 11 of circular shape. A spindle 2 projects upwardly through the center of the bottom 10, and supports a grill 3 at its upper end. The spindle is normally vertically adjustable as to height above the bottom, by means not necessary here to show, and the bowl itself is normally supported by suitable legs from the ground. Frequently such broilers are provided with a hood which overhangs one-half of the bowl, but since these are known, no attempt has been made to illustrate such elements here.

Instead of laying sand or fine gravel in the bottom of the bowl, the bowl is lined, as indicated at 12, with a metallic reflective surface, such as aluminum foil. This lining protects the bowl from heat and from drippings, and assists the broiling. When broiling is completed the foil can be disposed of, with the ashes, dripping, etc., that may fall upon it. A foraminous tray or basket 4, which may be of wire mesh and formed in general semicircular form, is provided. This basket has a bottom 40 and upstanding sides 41, and is of a size and shape preferably to fit closely within the rim 11 of the bowl at one side of the spindle 2. A second semicircular basket may be used also if desired, but for the grilling of a small amount of food it will often be found that only a single basket holding glowing charcoal will suffice, thus saving on fuel. In that case the second basket may be left in place or may be removed.

The bottom 40 of the basket does not slope downwardly toward the center as does the bottom 10 of the bowl, but rather is flat or level, so that except along the line where the bottom 10 joins the rim 11 of the bowl the basket is elevated above the bottom 10 of the bowl, and above the reflective lining 12 thereof. This provides space for air to flow beneath and around the briquets more freely than conventionally and this considerably expedites the full ignition of the briquets, which is ordinarily a slow process before they are ready to cook the meat. The bowl being circular and the basket being semicircular, the basket will retain its place merely by its semicircular marginal contact with the bowl, but for additional stability the basket may be provided with wire handles 42 which can hinge outwardly over the upper edge of the rim 11 of the bowl, at opposite ends of a diameter of the basket, and so will hold the basket firmly in place. The handles may later be grasped to remove the basket for the quenching operation without danger of burning the hands.

In use the basket, or the baskets if two are employed, is or are filled to any desired degree with charcoal lumps such as are indicated in FIGURE 1 at B, and these are ignited. When glowing properly the grill 3 is put in place and the grilling proceeds. Any ashes that are generated by the combustion of the briquets B may drop through the basket onto the bottom of the bowl, but the mesh in the bowl is of a small enough size to retain the briquet lumps until they are quite fully consumed. When the grilling is completed the grill 3 is removed, the basket 4 can be lifted by its handles 42 at the opposite ends, which because in use they lie outside the bowl are heated to a minimum degree, and the entire basket can then be immersed in a tub 5 which is of a size and shape to receive the basket 4 being in this instance semicircular, and which contains water W. In this manner the briquets B which were glowing to effect the cooking of the food are all at once immersed in the water and extinguished, and when dried will be ready for reuse. The wastage of briquets is thus seen to be a minimum.

Moreover, the tub 5 may be of a size to fit closely about the basket 4, and so the two nest together and take up a minimum of space. Indeed, both may be set within the bowl 1 and stored there. A single tub will suffice for two similarly shaped baskets, one being dipped in the tub after the other for quenching purposes.

While a wire basket has been shown, any foraminous material will serve, and such a basket may be made of punctured, slitted, or expanded sheet metal.

I claim as my invention:

1. A charcoal broiler comprising, in combination, a bowl structure including a bowl having a bottom and surrounding sides defining a broiler space therewithin, a quench tub nested removably within the bowl and adapted to contain and hold quench water, said quench tub having a bottom and surrounding sides at least certain of which sides conform substantially to the interior of the bowl, a charcoal container basket nested removably within the quench tub and alternatively adapted to nest directly in the bowl, said basket having a foraminous bottom and surrounding sides conforming substantially to the quench tub interior, a broiler grill, and means on the bowl structure to support said broiler grill thereon overlying the broiler space with the basket containing charcoal nested directly in the bowl beneath such grill.

2. The charcoal broiler defined in claim 1, wherein the bowl is of annular configuration, wherein the combination includes a second charcoal container basket, each basket having a side of substantially circular arcuate form and a connecting substantially straight side so that said baskets are mutually complemental and together substantially occupy said broiler space.

3. The charcoal broiler defined in claim 1, wherein the sides and also the bottom of the charcoal container basket are of wire mesh.

References Cited in the file of this patent
UNITED STATES PATENTS

| | | |
|---|---|---|
| 1,485,292 | Popper | Feb. 26, 1924 |
| 2,158,236 | Haislip | May 16, 1939 |
| 2,797,633 | Goodwin | July 2, 1957 |
| 2,820,446 | Freeman | Jan. 21, 1958 |
| 2,918,051 | Broman | Dec. 22, 1959 |